Dec. 11, 1956 T. A. FEENEY 2,773,659
FULL POWERED HUMAN PILOT-AUTOPILOT AIRPLANE CONTROL SYSTEM
Filed April 19, 1952 4 Sheets-Sheet 1

INVENTOR:
THOMAS A. FEENEY
BY Hubert E. Metcalf
HIS PATENT ATTORNEY

Dec. 11, 1956 T. A. FEENEY 2,773,659
FULL POWERED HUMAN PILOT-AUTOPILOT AIRPLANE CONTROL SYSTEM
Filed April 19, 1952 4 Sheets-Sheet 2

INVENTOR:
THOMAS A. FEENEY

HIS PATENT ATTORNEY

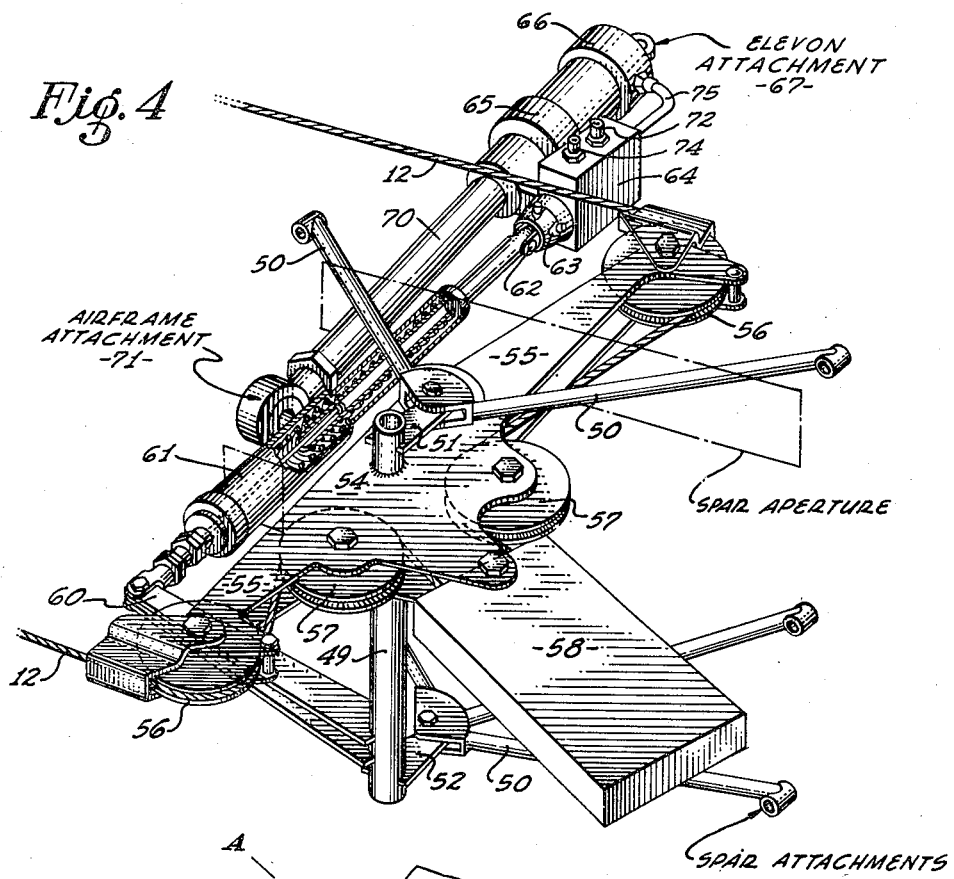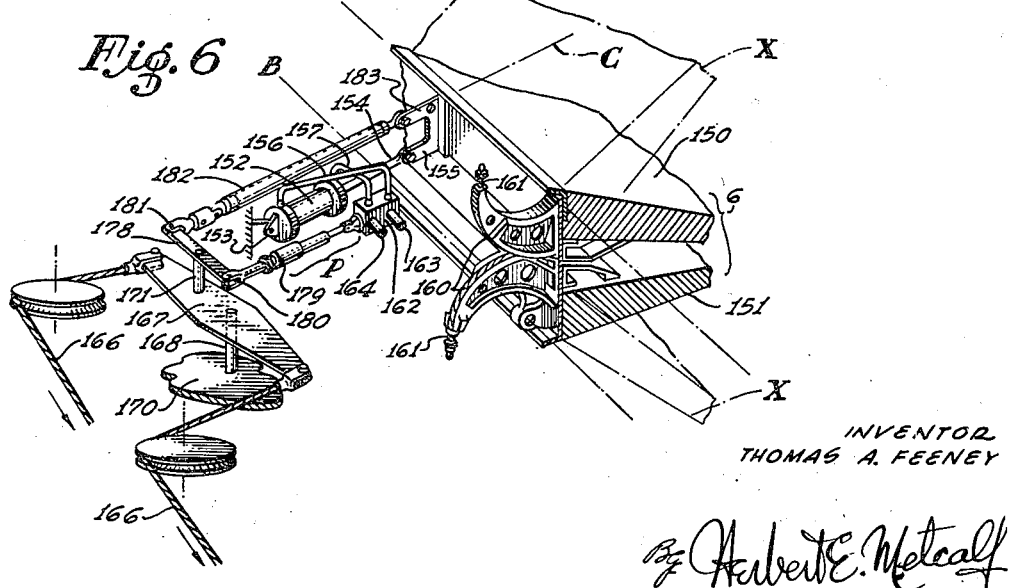

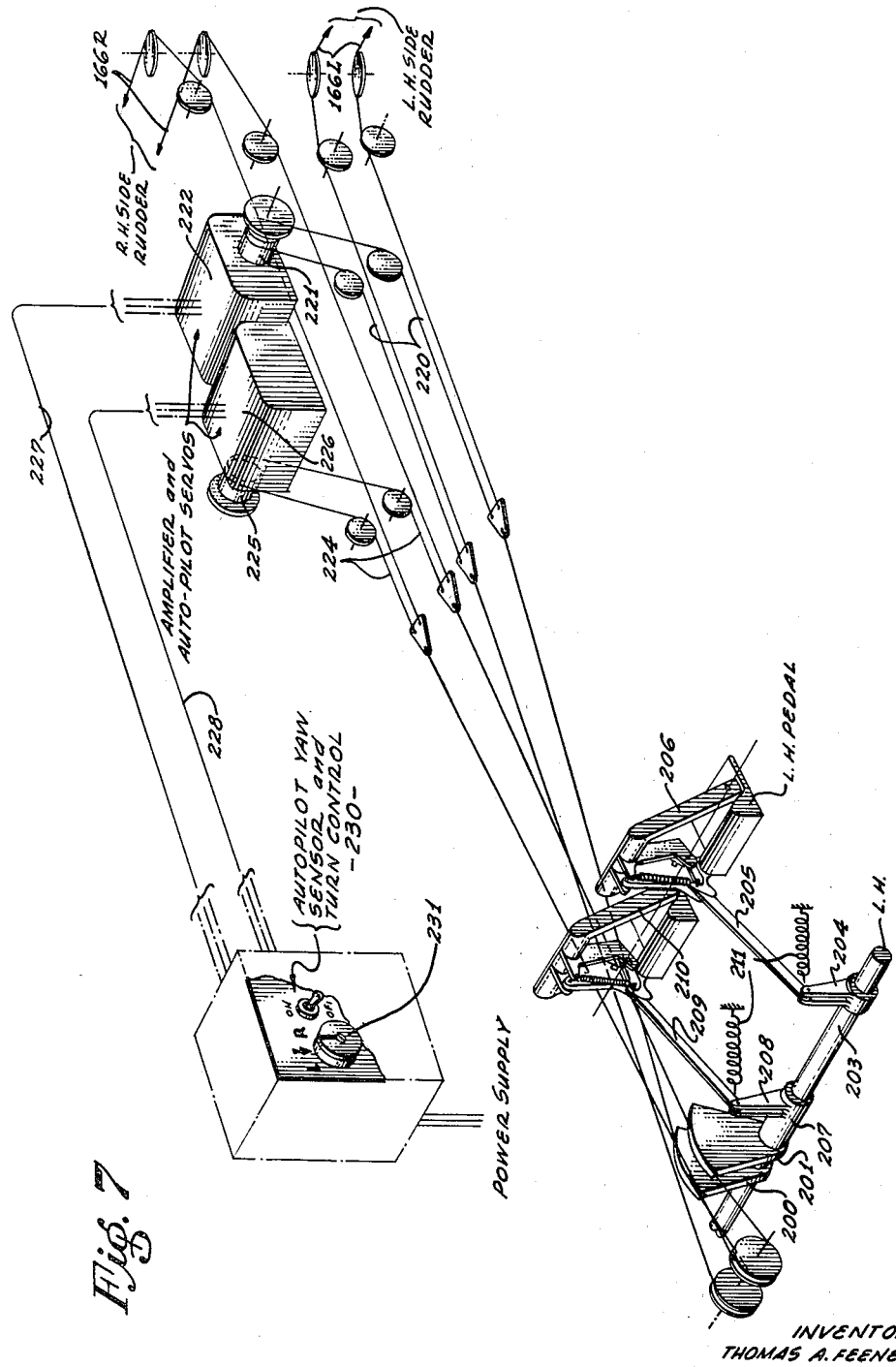

United States Patent Office 2,773,659
Patented Dec. 11, 1956

2,773,659

FULL POWERED HUMAN PILOT-AUTOPILOT AIRPLANE CONTROL SYSTEM

Thomas A. Feeney, Sherman Oaks, Calif., assignor to Northrop Aircraft, Inc., Hawthorne, Calif., a corporation of California Application April 19, 1952, Serial No. 283,208

7 Claims. (Cl. 244—76)

The present invention relates to full powered airplane controls and, more particularly, to a means and method of controlling large airplane control surfaces under power only, by a minimum exertion of force by the pilot and autopilot of the airplane.

In a co-pending U. S. application, Serial No. 681,890, filed July 8, 1946 (now U. S. Patent No. 2,582,348), Northrop and Feeney have shown, described and claimed certain control surfaces suitable for all-wing airplanes, notably, those used on the U. S. Army bombers designated as the XB-35 and YB-49. These controls were shown to be full power operated under pilot control, and, as far as is presently known, the XB-35 and YB-49 airplanes are the first large airplanes to be successfully flown with full power operation of all control surfaces, although such power operation was extensively flight tested in smaller all-wing prototype of the XB-35, known as the N-9-M, prior to use in the XB-35. The N-9-M airplanes are believed to be the first airplanes of any type flown with full powered controls. The full power controls per se, are shown, described and claimed in my sole application, now abandoned, Serial No. 23,567, filed April 27, 1948.

The present application is a continuation-in-part of said latter application.

The full powered surface controls of the XB-35 bomber, as disclosed in said cited applications, are hydraulically operated under the application of minimum stick force by a human pilot, without control surface feedback or feel being transmitted to this pilot, and the present invention has for an object the provision of a human pilot and autopilot control system suitable for use in airplanes where the surface loads are large, such as for operating the large control surfaces used on the XB-35 and YB-49 for example, or for operating smaller control surfaces utilized in controlling high speed (near sonic and sonic) fighter airplanes for example which, because of high air speeds, also develop high control surface loads in flight.

The use of control surfaces having large air loads imposed thereon in flight has led, in some instances, to the use of power boost systems where the human pilot supplies part of the force necessary to move the control surfaces, with a power source supplying the remaining force, in order that the force that the human pilot has to exert be within reason. Such a power boost may be of two types. The control surfaces may be made to be nearly aerodynamically balanced in various positions away from neutral, the air stream supplying a portion of the force opposing movement of the surface; or a power unit such as a hydraulic motor may be applied to the surface to provide a force necessary to augment the pilot applied force. In both cases force is transmitted back to the human pilot from the control surfaces, this force providing what is known as human pilot "feel" of the aerodynamic forces built up on the control surface, and this feed-back force must be overcome by the pilot.

The first of these expedients increases aerodynamic drag of the control surfaces, while the second involves complicated structure tending to increase weight and to cause hunting of the control surfaces. It is an object of the present invention to provide a means and method of operating airplane control surfaces under the control of a human pilot and/or an autopilot under full power without transmitting force back to either of these pilots, and with a simple mechanical unit that has minimum hunting characteristics.

With full power operation of the control surfaces, in accordance with the present invention, the applied piloting force need only be nominal whether applied by a human pilot or an autopilot, and it is another object of the present invention to provide a full power operated airplane surface control where the force applied by the human pilot and/or an autopilot for operation thereof, is of negligible importance irrespective of the actual force required to move the control surface.

It is a further object of the invention to provide a full powered means for operating an airplane control surface, where the same power means is controllable by signals of substantially equal magnitude initiated either by a human pilot or by an autopilot interchangeably.

It is a still further object of the invention to provide a fully powered airplane attitude surface control where the power applying device is common to both a human pilot control element and an autopilot control element, without feeding back any control surface loads to either pilot.

The term "autopilot" as used herein refers to a mechanical and/or electrical device mounted in an airplane and adapted to sense airplane attitudes or accelerations in flight and to create as a result of such sensing, signals at least broadly comparable to those that normally would be made by a human pilot for operating the airplane in the same desired manner.

Other objects and advantages of the present invention will be apparent from a description of the appended drawings in which:

Figure 4 is a perspective view of one preferred form of hydraulic motor power unit used for full power control of the elevons on the airplane of Figure 1.

Figure 6 is a perspective view of a preferred nonlinear linkage of a hydraulic motor to move the rudder surfaces of the airplane of Figure 1.

Figure 7 is a perspective diagrammatic view of the rudder pedals and autopilot conections used in conjunction with the rudder motor of Figure 6.

Figure 1:
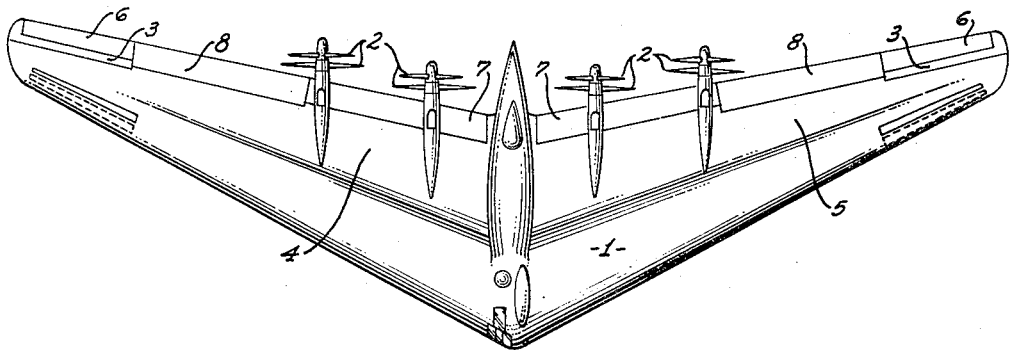
Figure 1 is a diagrammatic plan view of one form of airplane to which the present invention may be applied.

Referring first to Figure 1, the all-wing airplane 1 shown diagrammatically is the XB-35, having four reciprocating motors within the airplane driving pusher propellers 2 and having a wing spread of 172 ft. with a length of 53 ft. The controls for this airplane comprise outer trim flaps 3 on each wing panel 4 and 5, having separable drag rudders 6 mounted thereon, inner landing flaps 7 and intermediate elevons 8. All of these control surfaces are full power operated by the pilot with no pilot force whatever being applied to the control surfaces, and the present invention will be described as applied to the power motors used for full power operation of the elevons and drag rudders.

Figure 2:
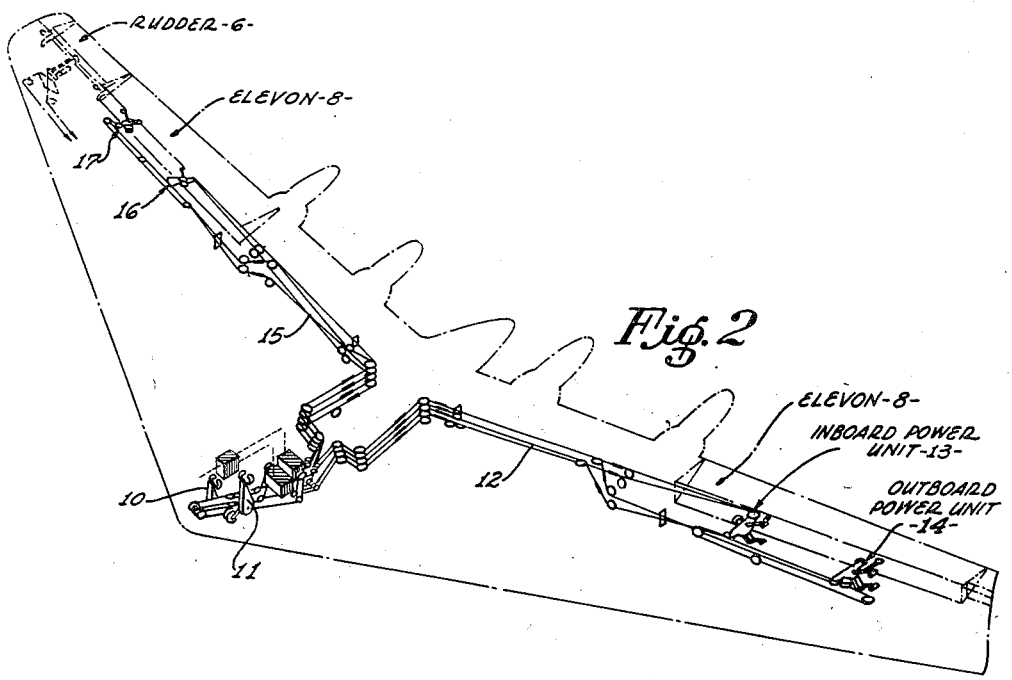
Figure 2 is a diagram of the cable and motor assembly used to move the elevons of the airplane shown in Figure 1.
Figure 3:
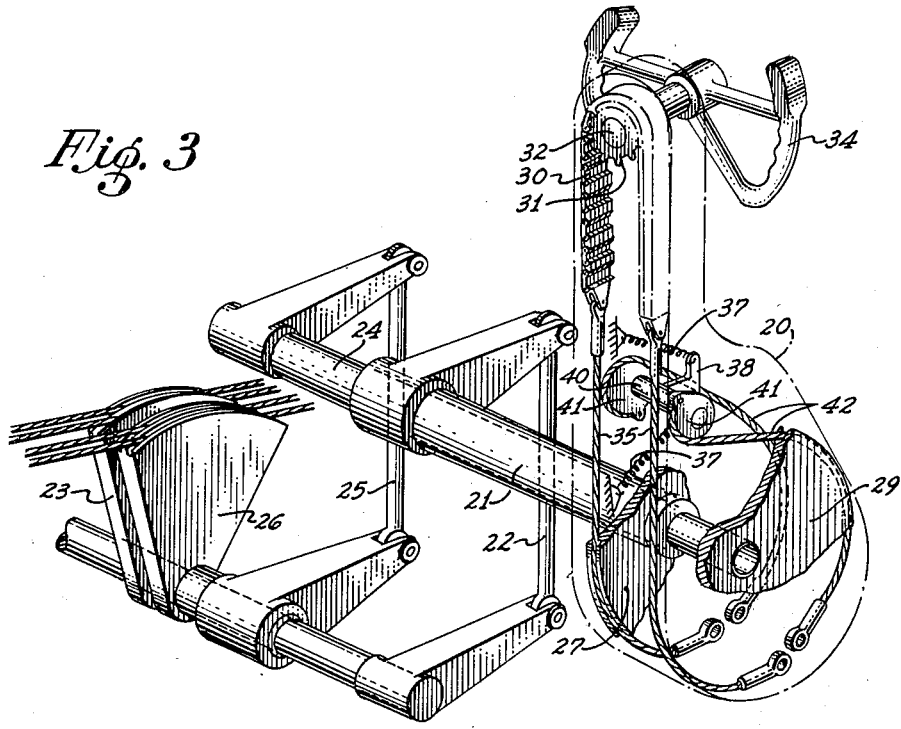
Figure 3 is a perspective view of a pilot's control column connected for elevon control.

The elevon control is shown diagrammatically in Figure 2. Here the pilot's control column 10 and copilot's column 11 are interconnected and then connected by cables 12 to the left elevon motors, there being preferably two, an inboard power unit 13 and an outboard power unit 14 connected to move the left elevon. Similarly, cables 15 connect the control columns with a right inboard power unit 16 and a right outboard power unit 17. These power units are connected to be operated in parallel on each elevon, and the elevons are operated together in the same direction for elevation control and in opposite directions for aileron type control, thus giving rise to the term elevon. The elevons can be moved in this manner for example, by the construction of the control column as shown in Figure 3, which will next be briefly described.

A control column casing as indicated by broken line 20 is mounted on a composite shaft comprising an outer tube 21 connected by linkage 22 to one cable quadrant 23, and an inner shaft 24 connected by another linkage 25 to another cable quadrant 26. Inside casing 20 a tube drum 27 is mounted on tube 21 and a shaft drum 29 is mounted on shaft 24, these drums being of the same diameter and cut away in the figure for clarity. A chain 30 is driven by a sprocket 31 on one end of wheel shaft 32, the wheel shaft 32 extending out of casing 20 with a wheel 34 mounted thereon.

The ends of chain 30 are connected to chain cables 35, one passing about halfway around tube drum 27 and then being fixed thereto, the other passing similarly around shaft drum 29. Thus when wheel 34 is rotated, opposite motion of cable quadrants 23 and 26 are obtained, and when the casing is rocked forward or aft, both quadrants will move together for elevator type control. Opposed springs 37 are attached to the casing 20 and to levers 38 attached to centering shaft 40 which has end drums 41 thereon connected on opposite sides to centering cables 42 one of which passes around drum 27 and the other around drum 29 to be affixed thereto. Opposed springs 37 provide forces contralizing wheel 34 in a predetermined neutral position. The centralizing system for elevator movement of the column is not shown but may be similar to that described above, or may be of a type applying an aerodynamic feel from a bellows actuated primarily by an air flow separate from the controlled surface for example, as shown, described and claimed in the Ashkenas patent, No. 2,559,817, issued July 10, 1951.

I refer next to Figure 4, which shows in perspective view an installation of a hydraulic motor as used to operate an elevon. A vertical axle 49 is placed within a wing panel, for example, and pivoted to wing spar attachments 50 at each end thereof respectively, by short bellcrank arms 51 and 52 respectively. Above, axle 49 carries a pulley plate 54 extended to cross arms 55 carrying end pulleys 56 over which run control cables 12 operated by the pilot from the control column 10 or 11. Cables 12 pass around tension box pulleys 57 to enter a cable tensioning box 58 attached to the pulley plate 54 as is well known in the art. Rotation of axle 49 by the pilot moves long bellcrank arm 60 which is attached to a spring loaded valve operating rod 61 passing through an aperture in the wing spar to link directly with a valve spool attachment 62.

Valve spool attachment 62 enters a valve assembly 63 inserted in a valve block 64 securely fastened to one end of a hydraulic motor cylinder 65, the other end 66 of cylinder 65 being attached to an elevon operating arm (not shown) by elevon attachment 67. A hydraulic piston rod 70 enters cylinder 65 opposite elevon attachment 67 and is attached to the airframe by wing attachment fitting 71. Piston rod 70 is, as is well known in the art, attached to a hydraulic piston (not shown) inside of cylinder 65.

Valve block 64 is provided with hydraulic fluid pressure inlet 72 connected to a constant pressure source (not shown) and fluid return pipe 74. The piston rod end of the cylinder 65 is supplied with fluid through the valve block, and the closed end of the cylinder is supplied through the block and through outside pipe 75.

Figure 5:
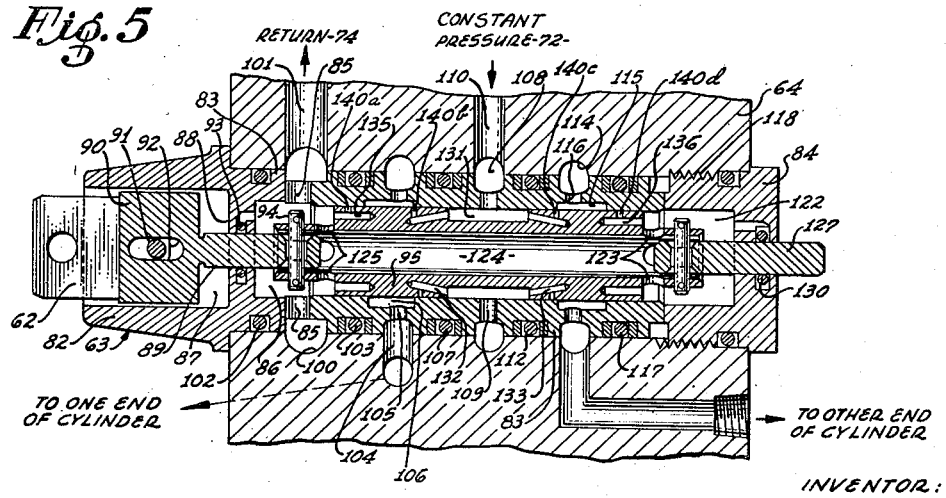
Figure 5 is a longitudinal sectional view of a hydraulic control valve used in the motor unit of Figure 4.

There are several preferred requirements for the operation of the valve assembly 63, namely, there should be a neutral leakage in the valve with a restricted flow increasing as the valve spool moves away from neutral, the valve should provide a preload on both sides of the piston to resist movement of the surface away from neutral due to air shock, and the valve should be sensitive, thereby permitting the pilot to make small corrective movements of the control surface. Several types of valves can satisfy these requirements and one of them will be described in detail herein, as shown in Figure 5. This particular valve is shown, described and claimed by Parker in U. S. Patent No. 2,631,571, issued March 27, 1953.

In Figure 5, valve assembly 63, one end of which projects from valve block 64 in Figure 4, comprises two relatively movable elements, i. e., a casing element adapted to be fastened into valve block 64, and an inner spool element to be moved by valve operating rod 61. The casing element starts at the left of the figure, with a hollow spool slide end 82 followed by a barrel portion 83 of uniform outer diameter to terminate in a threaded end 84.

The inner terminus of slide end 82 is provided with opposed ports 85 entering a return chamber 86 which is separated from a slide chamber 87 in this end by a partition 88 bored out to pass a spool rod 89 attached outside of partition 88 to a slide 90 in turn attached to valve spool attachment 62. Slide 90 is held to a fixed travel by slide pin 91 attached to slide end 82. This pin passes through elongated hole 92 in the slide 90. A spool rod packing 93 is installed in partition 88. Spool rod 89 is attached by spool pin 94 to a spool element 95 sliding inside of the spool casing. Spool pin 94 is in line with opposed ports 85 for easy assembly. Spool 95 will be described later.

On the outside of the spool casing, communicating with opposed ports 85, is a return fluid groove 100, which, when the valve assembly is in place in valve block 64, communicates with fluid return pipe 74 on the valve block through return bore 101. An outer slide end packing seal 102 isolates return fluid groove 100 from the outside of the valve block.

To the right of the return fluid groove 100 is an outer ring seal 103 separating outer fluid return groove 100 from one cylinder chamber groove 104 having circumferential cylinder ports 105 therein communicating with inner cylinder chamber groove 106 facing the spool 95. Another outer ring seal 107 follows, then an outer pressure fluid groove 108 communicating with the interior of the spool casing without an inner groove by pressure ports 109.

The outer pressure fluid groove 108 connects through valve block 64 with pressure inlet 72 through pressure bore 110.

Next is still another ring seal 112 followed by a second outer cylinder chamber groove 114 connecting with an inner second cylinder chamber groove 115 by circumferential return ports 116. A fifth ring seal 117 follows. Next comes the threaded end 84 with threads 118 sealed from the outside by threaded end ring seal 119.

Threaded end 84 is provided with a threaded end return fluid chamber 122 connecting with slide end return chamber 86 by threaded end ports 123, through a central spool bore 124 and slide end ports 125. These latter ports 125 connect with return groove 100, bore 101, and then return pipe 74.

Both ends of spool 95 are exactly alike, the spool being attached at the threaded end to a spool idler rod 127 by idler pin 128. Idler rod 127 passes through the threaded end 84 and is sealed by idler rod seal 130 mounted in the threaded end. As the exposed areas at each end of spool 95 are the same, no piston effect is applied by the return fluid pressure. This dynamic balancing aids in preventing any reactionary forces of fluid flow or pressure from acting on the spool.

Opposite pressure ports 109 leading to outer pressure fluid groove 108, the spool is cut away to form a circumferential fluid distributing groove 131 extending equal distances, when the spool is in neutral position, on each side of pressure ports 109. This distributing groove 131 is provided with sides normal to the surface of the bore in which the spool slides, and a plurality of circumferentially distributed pressure bores 132 and 133 extend longitudinally in the spool wall from respective sides of the pressure distributing groove 131 a sufficient distance to terminate beyond the near sides of inner first and second cylinder chamber grooves 106 and 115 in the spool casing.

Both ends of the spool 95 are also cut away opposite return fluid chambers 86 and 122 to form shoulders which also have circumferentially spaced return bores 135 and 136 extending longitudinally into the spool 95 past the opposite sides of the inner first and second cylinder chamber grooves 106 and 115 respectively.

The spool construction is completed by four sets 140a, 140b, 140c and 140d of flow holes bored normal to the peripheral surface of the spool and entering the various bore holes 132, 133, 135 and 136 respectively. Each such set of holes has a plurality of flow holes arranged circumferentially around the spool 95, and individually staggered lengthwise relative to the spool. These flow holes are bored with definite patterns with respect to the various inlets and outlets of casing and spool. These flow holes are used to pass all the liquid flow through the valve, as slide pin 91 limits the travel of the spool to less than the travel required to open pressure groove 131 on the spool to either of the inner cylinder chamber grooves 106 or 115.

In Figure 5, the spool is shown in neutral position. The flow holes of sets 140b and 140c nearest to the pressure inlet are arranged to be bisected by the more central shoulders of cylinder grooves 106 and 115, as shown. The flow holes (not shown) of sets 140a and 140d nearest the ends of the spool are also bisected by the outer shoulders of return flow grooves 106 and 115 respectively. The reason these particular holes do not appear in Figure 5 is that in the actual spool construction, they are located in the near or far side of the cylindrical spool surface and thus do not appear in the sectional view through the vertical center plane. Thus, in neutral position a small flow is constantly applying pressure to both ends of cylinder 65 through the centrally bisected flow holes. The fluid then leaks to the return through flow holes 140a and 140d.

In one preferred form of valve a pressure of 2000 p. s. i. from a constant pressure source is used in pressure inlet 72 and the bisected flow holes are proportioned to provide a pressure drop of 1000 p. s. i. In consequence, there is at all times, in the neutral spool position, a preload of 1000 p. s. i. on both sides of the cylinder piston, thus preventing motion of the attached control surface under shock conditions.

A minute movement of the spool of only about .007" in the case of the use of .013" flow holes for example, will close the normally bisected flow holes on one side of the spool and open the other normally bisected holes. Then fluid flow to one side of the piston will be made at a highly restricted rate as determined by the pressure and hole diameter so that the piston moves very slowly. Further motion of the spool will uncover more holes in the patterns on one side of the spool and close those on the other so that an increasing, but still restricted, flow will be obtained to move the piston faster.

In one specific example, neutral flow rate of about .02 G. P. M. is provided as the holes are bisected. Then as the spool is moved so that one hole is completely open with the opposite hole completely closed in both pressure and return channels, the flow rises to about 4 G. P. M. with the spool moved in either direction, with a spool travel of only about .015" from neutral, providing a full spool travel of about .030" relative to the casing.

In the preferred form of motor shown in Figure 4, the valve operating rod 61 is spring loaded in both directions. This rod, under all normal circumstances, act as a solid rod as far as the operation of the valve is concerned. This spring loaded rod, however, permits full operation of one motor unit when the valve spool of the other motor unit is jammed, and prevents damage to the valve spools if the pilot's control element is operated without hydraulic pressure on the cylinder piston.

In operation, it will be noted that as the cylinder is attached to the elevon operating arm and the piston rod to the wing, and as the valve and valve block is attached to the cylinder, with the valve operating rod 61 coming from the wing, no additional mechanical feed-back link is needed. With the valve operating rod 61 in neutral position the elevon is held in neutral position by the preload mentioned above. When the valve operating rod 61 is moved away from neutral by the pilot the spool is moved and fluid is admitted to one or the other sides of the piston, with the opposite side of the piston open to the fluid return. The cylinder then moves in accordance with the pressure application, and the elevon is moved. As the elevon moves, however, the valve also moves as it is attached to the cylinder but the spool does not, as it is held in position by the pilot. When the neutral point of the spool within the valve is reached the elevon movement stops, having moved away from neutral in accordance with pilot control movement. Thus the cylinder and, consequently, the elevon will follow all pilot initiated movement of the valve operating rod 61. The extremely short feed-back circuit created by the attachment of the valve to the cylinder with cylinder moving with the elevon effectively prevents hunting.

As the cylinder and valve casing are both attached to the elevon and move with it, the follow-up movement of the cylinder and valve casing is equal to the initiating movement of the valve spool by the pilot. As the aerodynamic response of elevon movement is substantially linearly related to movement of the elevon, it is clear that in this construction the aerodynamic response will be substantially linearly related to movement of the pilot's control.

In certain types of airplanes, such as the all-wing airplane shown in Figures 1 and 2, it is desirable to employ drag type rudders to achieve directional control, because of the absence of a tail section for mounting a conventional rudder. Such drag rudders may take the form of hinged flaps simultaneously opened to project both above and below the trailing edge of the wing, preferably near the tips thereof. Using such a split-flap rudder, a linear relation between pilot's rudder pedal movement and rudder surface separation does not provide a linearly related amount of aerodynamic response. Instead, there must be a relatively large movement of the rudder surfaces near the closed position to obtain a small aerodynamic response, changing into a small surface movement near the full open position for a large response. Since it is desired to provide a linear relation between rudder pedal movement and aerodynamic response, a biased feed-back system is desirable for operation of the rudder surfaces. Such a motor unit is shown diagrammatically in Figure 6.

Full power operation of the rudder is accomplished by the pilot, through a conventional cable control system from rudder pedals 206 and 210, shown in Figure 7, operating the hydraulic servo valve, preferably of two power units P, as in the aileron control above described, which govern the opening and closing of the rudder flaps. In order that each rudder pedal position will correspond to a definite surface position, a follow-up rod driven by the rudder is used to shut off the servo valve when the correct surface separation is reached. The relation between rudder pedal displacement and surface movement is made non-linear by the fact that one end of the follow-up describes a circular arc, while the other end traces a straight line, identical in part to the motion of a connecting rod between a piston and crankshaft.

In Figure 6, showing one motor unit P only, each rudder 6 consists of two panels or flaps 150 and 151, one mounted on top of the other along the trailing edge of trim flap 3 (Figures 1 and 2), with their forward edges hinged to the trim flap 3 along axes A and B respectively, so that when they are operated, one will rotate upwardly and the other will rotate downwardly, assuming the position indicated by the dotted lines X. The upper rudder flap 150 is rotated about its hinge line A by the action of a hydraulic rudder cylinder 152, the forward end of which is anchored to the aircraft structure 153. A piston rod 154 projects aft from the cylinder 152 and attaches to an operating arm 155 mounted on the upper rudder 150. The other end of the piston rod 154 is connected to the customary piston (not shown) enclosed in the rudder actuating cylinder 152. Hydraulic supply and return lines 156 and 157 are connected to the cylinder 152 on opposite sides of the enclosed piston, so that fluid pressure may be made to extend or retract the piston rod 154 and thereby operate the upper rudder flap 150.

Two opposing quadrants 160 are installed in back-to-back relationship, one on the upper rudder flap 150 and one on the lower rudder flap 151. Crossed cables 161 are then connected, each with one end attached to the forward end of one quadrant 160, and the other end attached to the aft end of the opposite quadrant, to cause the lower rudder 151 to operate from the upper rudder 150, but in the opposite direction. This is similar to the manner shown in U. S. Patent No. 2,582,348, issued January 15, 1952, to J. K. Northrop et al. The hydraulic supply and return lines 156 and 157 connect to a rudder servo valve 162 which controls the actuating cylinder 152. Also connected to the servo valve 162 is a hydraulic pressure supply line 163 and a return line 164 from the airplane's hydraulic system. As in the previous embodiment, a valve spool is provided which, by its position within the valve 162, determines which of the cylinder lines 156 or 157 is pressurized, or, which in the neutral position, almost closes both cylinder lines 156 and 157. The body of the servo valve 162 is held to the aircraft structure 153, while the valve spool is free to slide, within limits, in or out of the servo valve. The entire servo valve 162 may be similar to the example previously described except that it is attached to the aircraft structure instead of to the actuating cylinder. In addition, due to an increased airload it may be desirable to have fluid flow in the rudder valves approximately twice that used in the elevon valves.

Two rudder control cables 166 from one of the pilot's rudder pedals connect, one to each end of the cable lever 167 pivoted on a support shaft 168 midway between the ends. This support shaft 160 is mounted on a bracket 170 firmly attached to the aircraft structure 153. A link pin connection 171 is provided on the cable lever 167, between shaft 168 and one of the cable attachments. To the link pin connection 171, a valve feedback link 178 is rotatably attached approximately at its midpoint, above the cable lever 167. One end 180 of the valve link 178 is connected by a spool rod 179 to the valve spool, this connection to link 178 being at a point preferably coaxial with the cable lever support shaft 168 when the servo valve spool is in the neutral position. The other end 181 of the valve link 178 is pinned to one end of a spring loaded follow-up rod 182, which connects to a horn 183 that is firmly attached to the upper rudder 150, and projects forwardly and slightly downwardly from the hinge axis A.

In the closed position of the rubber flaps, the follow-up rod 182 is not on a straight line with the hinge axis A, but is nearly so, the extended center line C of the follow-up rod 182 passing slightly beneath the hinge axis A, as shown in Figure 6.

When drag rudders are used, it is customary to connect the rudders on one wing tip to only its own operating pedal in order that both rudders may be opened up simultaneously to obtain bilateral drag, as will be later described.

In operation, when one rudder pedal 206 or 210 is pushed by the pilot, the cable lever 167 connected to that pedal rotates clockwise, as viewed from above, about its support shaft 168, displacing the link pin connection 171 to the right. This rotates the valve link 178 about the forward end of the follow-up rod 182, which is yet stationary, and moves spool rod 179 toward the servo valve 162, admitting fluid pressure to the proper end of the actuating cylinder 152 to separate the rudders 150 and 151. As the upper rudder 150 rotates about its hinge axis A, the horn 183 moves downwardly and to the rear, also about the same hinge axis A. The follow-up rod 182 is thus pulled to the rear, and now the valve link 178 pivots about the link pin connection 171, which is stationary while the pedal is being held down. The valve link 178, driven by the follow-up rod 182, returns the valve spool to its neutral position, stopping the rudder surface movement. The servo valve 162 is now closed and the rudders are held in some open position until subsequent movement of the cable lever 167. In a manner similar to that described, any surface position can be obtained by the proper amount of pedal displacement.

As the rod 182 and horn 183 are nearly in alignment at the beginning of rudder flap movement, the feed-back travel of rod 182 and connected valve spool will be small during the initial movement of the rudder surfaces. Thus the rudder surfaces will separate a substantial distance before shutting off flow in valve 162. However, after the rudder surfaces have opened a substantial distance the angle of horn 183 with rod 182 approaches 90° and the follow-up response approaches linearity. Thus, for a given movement of the rudder pedal, movement of the rudder surfaces is greater near the closed position than near the open position thereof.

This non-linearity is used to make the aerodynamic response of the surfaces substantially linear with movement of the rudder pedal. In the XB-35 airplane described above, the aerodynamic response to rudder flap separation is small until the flaps are separated about 4 inches at their trailing edges. This initial separation can be made to take place with a very small pedal movement by use of the linkage described above.

As each rudder pedal is moved by pilot applied force in one direction only, follow-up rod 182 need be spring loaded in one direction only. This spring loading will permit rod shortening under pilot force when a spool is jammed, and will also prevent undue pilot force being suddenly applied to valve 162 when no hydraulic pressure is present to move the rudder surfaces, which would bottom the spool and be likely to cause damage. In addition, the spring loaded rod will, particularly when used on rudders of the split-flap type described herein, permit the surfaces to be forced back toward the closed position by air loads applied thereon when, for example, it would be dangerous for the surfaces to be fully separated, as at high speed. This safety feature is accomplished by regulating the maximum applied hydraulic force to a figure where safe airloads on the surfaces cannot be exceeded. Under these circumstances, at this airload the surfaces will not open further. If, however, the pilot should hold his valve wide open, and the airload should close the surfaces, the valve spool might bottom in the valve 162 so that the entire airload of the surfaces could be transmitted back to the pilot. To prevent this, the spring in rod 182 will compress upon an applied load of about 85 lbs.

While the present invention has been described as being applied to the control of various surfaces in airplanes of the all-wing type, it obviously can be utilized for the control of any airplane control surface where the aerodynamic restoring forces are large and where the aerodynamic response is either substantially linear or non-linear with surface movement. In either case the aerodynamic response can be made substantially linearly related to movements of the pilot's control element.

From the above description it will also be clearly seen that the present invention makes possible the full power operation of airplane control surfaces irrespective of size or aerodynamic resistance to control surface motion. There is no feed-back of any kind from surface to pilot. The operation of the hydraulic cylinder requires only a few pounds of pilot effort, little more, in fact, than that required to overcome the overall resistance of the cable system and the control neutralizing system. Neutralization of the controls is performed by balanced elastic forces at the pilot's location and the overall pilot effort for normal piloting is small and constant, irrespective of control surface area and aerodynamic forces exerted thereon. The control forces may be made any desired magnitude or made to vary in most any desired manner. They may be altered with ease after the airplane is flown. Since the control forces can be made any desired magnitude, a control stick rather than a column and wheel becomes possible even on large airplanes, thus simplifying cockpit design and improving instrument visibility.

As the control cables carry only friction forces and are used to transmit a signal rather than a force, the cables may be very small in diameter with resulting decrease in friction, weight, and sensitivity to temperature changes.

A number of other advantages will be apparent to those skilled in the art. For example, trimming through the full range of surface travel is easily accomplished and can be done without loss of surface power that would normally result from the displacement of a tab and emergency flight control and ground control locks become unnecessary. In addition, the present invention permits the use of one surface to accomplish landing flap, dive brake, and aileron functions, for example, since erratically varying hinge moments will not cause erratic control forces.

Again, because of the relative simplicity as compared to a power boost system, the fully powered system of the present invention is less vulnerable to damage in military use and maintenance problems are reduced.

Reference has been made so far herein to the pilot of the airplane as being human. However, as pointed out in my sole application cited above of which this application is a continuation-in-part, the characteristics of the system of the present invention are such as to make the invention ideally suited for both human pilot and autopilot operation interchangeably.

An autopilot is attached to operate the full powered controls described herein, by being connected in parallel to the same cables that are normally moved by the pilot.

As an autopilot connection to the elevons requires that a signal mixer be used between a pitch sensor and a roll sensor (this type of connection per se forming no part of the present invention) the present invention will be described as being used in conjunction with the rudders 6, as best shown in Figures 2, 6, and 7. The rudders, or yaw control devices are, in the airplane shown, of the drag type on the trailing edge of the wing panels adjacent the wing tips and are operated by the rudder cables 166 through the hydraulic power unit P (Figure 6). Rudder cables 166 extend inwardly along the two wing panels and then turn forwardly, passing over and attached to a side by side pair of rudder cable quadrants 200 and 201 as shown in Figure 7. Left hand quadrant 200 is mounted on a shaft 203 rotated through left hand quadrant arm 204, and left hand rod 205, the latter being attached to the customary left rudder pedal 206.

The right hand quadrant 201 is carried by a sleeve 207 rotatable on shaft 203, this sleeve carrying a right hand arm 208 attached to a right hand rod 209 connected to right rudder pedal 210.

Movement of one rudder pedal or the other will open and/or close the corresponding right or left rudder panels 150 and 151, and as these rudder surfaces are under full power control of the hydraulic motor units P, the pilot need only to apply force enough through cables 166 to move the valve spool 95 in the power unit P plus that required to overcome whatever resistance is supplied by artificial centering force producers 211 which it may seem desirable to use with the rudder controls.

To obtain autopilot control, left hand rudder cables 166L are connected in parallel with left hand servomotor cables 220 running over left hand servomotor pulley 221 rotated by left hand electric servomotor 222. The right hand rudder cables 166R are connected in parallel with right hand servomotor cables 224 running over right hand servomotor pulley 225 driven by right hand electric servomotor 226.

The two servomotors 222 and 226 are energized through left and right hand circuits 227 and 228 respectively from a yaw sensing device 230 such as, for example, the gyroscope as is commonly used in the usual type of autopilot where the autopilot servomotors directly operate the control surfaces that are normally operated only by force supplied by the human pilot. As in the usual autopilot, the yaw sensor 230 is provided with sensor controls 231 which, when operated by the human pilot will cause the yaw sensor to apply right or left rudder as desired.

While the rudders described herein are of the type that are operated on one side only at a time for yaw control, those skilled in the art will readily understand that a conventional type rudder or other control surface that moves from one side or the other from a neutral position for attitude control would have the power units P connected thereto and to the linkage in the same manner as described for operation of the ailerons, i. e. similar to the arrangement shown in Figure 4.

The full power pilot autopilot control system just above described differs radically from the usual autopilot system in that in the usual system the autopilot servomotors have to supply all of the force necessary to move the airplane control surfaces, whereas in the system of the present invention the autopilot servomotors 222 and 226 need only be strong enough to move the rudder pedal, cable, and valve train, all of the force required to move the surface being supplied by the hydraulic power units P. Thus, in effect, the power units P are power amplifiers. In addition, the autopilot servomotors 222 and 226 do not have to lock or otherwise hold or prevent the control surfaces from moving under aerodynamic shock, such as are applied to control surfaces by guests, for example, as this locking is done by the power units P through the balanced leakage system. Consequently, the autopilot servomotors 222 and 226 can be of the type that can be readily overridden and reversed if and when desired by human pilot force. This overriding can also be accomplished by the exertion of a human pilot force only slightly greater than that required to move the pedal, cable linkage, and valve train. In consequence no weighty and complicated override clutch in the autopilot is needed, and the entire system is always safe because no matter what the value or variation of values of the aerodynamic load (within design limits, of course) on the rudder surfaces may be, the autopilot servomotors 222 and 226 need only be designed to exert a constant force and, as stated above, that force need only be enough under any circumstances to move the valve spool 95, i. e., only a few pounds.

The autopilot system of the present invention is therefore completely safe, as the human pilot can always override it no matter what the control surface loads may be, and the autopilot system can, at the same time be of exceptionally light weight, as the servomotors 222 and 226 do not have to be made large to provide a huge reserve power for air load emergencies, as is customary.

While in order to comply with the statute, the invention has been described in language more or less specific as to structural features, it is to be understood that the invention is not limited to the specific features shown, but that means and construction herein disclosed comprise a preferred form of putting the invention into effect, and the invention is therefore claimed in any of its forms or modifications within the legitimate and valid scope of the appended claims.

What is claimed is:

1. In an aircraft having a movable attitude control surface, a fluid pressure servomotor of relatively high power connected to move said surface, said fluid pressure servomotor forming the sole actuating mechanism for the movement of said surface, a source of fluid pressure, balanced hydraulic valve means having two relatively movable valve elements connected between said source and said fluid pressure servomotor for actuating said servomotor with no feedback of control surface loads through said valve means in normal operation, a human pilot's attitude control element, a linkage connecting one of said valve elements with said pilot's control element, said linkage determining the position relation of said one valve element and said pilot's control element and containing a force producer for centering said pilot's control element, a follow-up driving connection from said surface to the other said valve element, said valve means being the sole possible load other than linkage forces on said pilot's control element over the entire range of movement of said pilot's control means and said linked valve means, an attitude sensor in said airplane, a relatively low power servomotor connected to said sensor and actuated in accordance with the output of said sensor, said low power servomotor being attached to said linkage for operation thereof.

2. In an aircraft having a movable attitude control surface, a fluid pressure servomotor of relatively high power connected to move said surface, said fluid pressure servomotor forming the sole actuating mechanism for the movement of said surface, a source of constant fluid pressure, balanced hydraulic valve means having two relatively movable valve elements connected between said source and said fluid pressure servomotor for actuating said servomotor with no feedback of control surface loads through said valve means in normal operation, a human pilot's attitude control element, a linkage connecting one of said valve elements with said pilot's control element, said linkage determining the position relation of said one valve element and said pilot's control element and containing a force producer for centering said pilot's control element, a follow-up driving connection from said surface to the other said valve element, said valve means being the sole possible load other than linkage forces on said pilot's control element over the entire range of movement of said pilot's control means and said linked valve means, an autopilot attitude sensor in said airplane, a relatively low power electric servomotor connected to said sensor and actuated in accordance with the output of said sensor, said electric servomotor being attached to said linkage for autopilot operation thereof.

3. In an airplane having an attitude control surface movable by a power unit including a hydraulic servomotor supplying the entire force required to move said surface and hold said surface in position under varying air loads, a balanced hydraulic valve assembly having two relatively movable valve elements in said unit moveable to control said hydraulic servomotor without feedback of control surface loads through said valve, a human pilot operated attitude control device, an automatic attitude sensing device, a sensing device output motor connected to respond in accordance with the condition of said attitude sensing device, means connecting said human pilot operated control device and said sensing device output motor to one of said valve elements only of said power unit, and a follow-up driving connection from said surface to the other said valve element, the power required of the human pilot and of said sensing device output motor to control said airplane being each the same as the other and both less than that required of said hydraulic servomotor to move said surface.

4. In an airplane having an attitude control surface moveable by a power unit including a hydraulic servomotor of relatively high power supplying the entire force required to move said surface and hold said surface in position under varying air loads, a balanced hydraulic valve assembly having two relatively movable valve elements in said unit moveable to control said hydraulic servomotor without feedback of control surface loads through said valve, a human pilot operated attitude control device, an automatic attitude sensing device, a sensing device output motor of relatively low power connected to respond in accordance with the condition of said attitude sensing device, and means connecting said human pilot operated control device and said sensing device output motor to one of said valve elements only of said power unit, and a follow-up driving connection from said surface to the other said valve element.

5. In an airplane having an attitude control surface moveable by a power unit including a hydraulic servomotor supplying the entire force required to move said surface and hold said surface in position under varying air loads, a balanced hydraulic valve assembly having two relatively moveable valve elements in said unit moveable to control said hydraulic servomotor without feedback of control surface loads through said valve, a human pilot operated attitude control device, an automatic attitude sensing device, a sensing device output motor connected to respond in accordance with the condition of said attitude sensing device, means connecting said human pilot operated control device and said sensing device output motor to one of said valve elements only of said power unit, and a follow-up driving connection from said surface to the other said valve element, the power required to move said valve being substantially less than the power required to move said surface.

6. In an airplane having a human pilot's control element and an autopilot connected to operate a control surface linkage, and an attitude control surface attached to said airplane and subject to aerodynamic loads greater than can be transmitted through said control linkage, means for amplifying the power exerted through said control linkage comprising a fluid pressure servomotor of sufficient power to move said surface connected to move said surface, said fluid pressure servomotor forming the sole actuating mechanism for the movement of said surface, a source of fluid pressure, balanced valve means connected to said source and to said servomotor for actuating said servomotor with no feedback of control surface loads through said valve means, said control linkage being connected to move said valve means, and a follow-up link connected from said surface to said valve means independently of said control linkage.

7. In an airplane control system, a control surface subject to relatively high air loads in flight, a control surface motor connected to move said control surface, a source of power for said control surface motor, said control surface motor when energized having sufficient power to move said control surface while subject to said airloads, a control surface motor control element movable to connect said source and said control surface motor to move said surface, the force required to move said control surface motor control element being substantially less than the force required to move said control surface, said control surface motor being connected to provide the entire control surface moving force, a human pilot's control element, linkage means connecting said human pilot's control element with said control surface motor control element, a movable control surface motor follow-up element having a driven connection with said surface to effectively shut off said source from said control surface motor to stop said surface in position correspondence with said pilot's control element, said linkage being sized to have sufficient strength to move said control surface motor control element but of insufficient strength to be capable of moving said control surface directly, and an autopilot servomotor of substantially lesser power than that of said control surface motor but capable of providing a force sufficient to move said linkage and said control surface motor control element, said autopilot servo motor being connected to said linkage.

References Cited in the file of this patent

UNITED STATES PATENTS

| | | |
|---|---|---|
| 738,739 | Green | Sept. 15, 1903 |
| 813,209 | Holmes | Feb. 20, 1906 |
| 1,199,036 | Hodgkinson | Sept. 19, 1916 |
| 1,628,603 | Ferris | May 10, 1927 |
| 1,928,144 | Vickers | Sept. 26, 1933 |
| 2,221,748 | Alkan | Nov. 19, 1940 |
| 2,227,375 | Carlson | Dec. 31, 1940 |
| 2,234,326 | Tiebel | Mar. 11, 1941 |
| 2,270,875 | Hanson et al. | Jan. 27, 1942 |
| 2,415,092 | Frische et al. | Feb. 4, 1947 |
| 2,432,502 | Bentley et al. | Dec. 16, 1947 |
| 2,488,286 | Glenny | Nov. 15, 1949 |
| 2,646,947 | Kutzler et al. | July 28, 1953 |

FOREIGN PATENTS

| | | |
|---|---|---|
| 490,572 | Great Britain | Aug. 17, 1938 |